United States Patent

Boffito et al.

[11] Patent Number: 5,408,832
[45] Date of Patent: Apr. 25, 1995

[54] THERMALLY INSULATING JACKET AND RELATED PROCESS

[75] Inventors: Claudio Boffito, Rho; Antonio Schiabel, Garbagnate; Allessandro Gallitognotta, Rho, all of Italy

[73] Assignee: SAES Getters, S.p.A., Milan, Italy

[21] Appl. No.: 278,129

[22] Filed: Jul. 21, 1994

Related U.S. Application Data

[63] Continuation-in-part of Ser. No. 38,643, Mar. 29, 1993, abandoned, which is a continuation of Ser. No. 979,326, Nov. 20, 1992, abandoned.

[51] Int. Cl.$^6$ ................................................. F17C 1/00
[52] U.S. Cl. ....................................... 62/451; 62/46.2; 62/51.1
[58] Field of Search ..................... 62/45.1, 51.1, 46.2

[56] References Cited

U.S. PATENT DOCUMENTS

| | | | |
|---|---|---|---|
| 2,329,765 | 9/1943 | Jackson et al. | 62/46.1 |
| 2,768,046 | 10/1956 | Evans . | |
| 2,779,066 | 1/1957 | Gaugler . | |
| 2,817,124 | 12/1957 | Bybvig | 20/4 |
| 2,863,179 | 12/1958 | Gaugler . | |
| 2,900,800 | 8/1959 | Loveday | 62/45.1 |
| 2,989,156 | 6/1961 | Brooks et al. . | |
| 3,108,706 | 10/1963 | Matsch et al. | 62/45.1 |
| 3,114,469 | 12/1963 | Francis et al. | 62/46.1 |
| 3,130,561 | 4/1964 | Hnilcka, Jr. | 62/45.1 |
| 3,139,206 | 6/1964 | Matsch | 62/45.1 |
| 3,147,877 | 9/1964 | Beckman | 62/45.1 |
| 3,151,364 | 10/1964 | Glaser et al. | 20/4 |
| 3,179,549 | 4/1965 | Strong et al. . | |
| 3,199,715 | 8/1965 | Paivanas | 220/9 |
| 3,264,165 | 8/1966 | Stickel . | |
| 3,461,678 | 8/1969 | Klipping et al. | 62/45.1 |
| 3,514,006 | 5/1970 | Molnar | 220/14 |
| 4,000,246 | 12/1976 | Walles . | |
| 4,048,361 | 9/1977 | Valyi . | |
| 4,154,364 | 5/1979 | Hagiwara et al. . | |
| 4,159,359 | 6/1979 | Pelloux-Gervais . | |
| 4,269,323 | 5/1981 | Ito et al. . | |
| 4,444,821 | 4/1984 | Young et al. . | |
| 4,510,758 | 4/1985 | Tench, Jr. | 62/45.1 |
| 4,529,638 | 7/1985 | Yamamoto et al. . | |
| 4,536,409 | 8/1985 | Farrell et al. . | |
| 4,662,521 | 5/1987 | Moretti . | |
| 4,668,551 | 5/1987 | Kawasaki et al. . | |
| 4,668,555 | 5/1987 | Uekado et al. . | |
| 4,669,632 | 6/1987 | Kawasaki et al. . | |
| 4,681,788 | 7/1987 | Barito et al. . | |
| 4,683,702 | 8/1987 | Vis . | |
| 4,702,963 | 10/1987 | Phillips et al. . | |
| 4,726,974 | 2/1988 | Nowobilski et al. . | |
| 5,018,328 | 5/1991 | Cur et al. . | |
| 5,082,335 | 1/1992 | Cur et al. . | |
| 5,091,233 | 2/1992 | Kirby . | |

FOREIGN PATENT DOCUMENTS 1157711  12/1982  U.S.S.R. ................. 62/46.3

Primary Examiner—Ronald C. Capossela
Attorney, Agent, or Firm—Quaintance & Murphy

[57] ABSTRACT

Improved process for evacuating the thermally insulating jacket of a dewar having an inner wall and an outer wall, with the inner space between said walls completely or partially filled with an insulating material, containing also a moisture sorbing material and a getter material, in which said moisture sorbing material is a chemical drying agent.

20 Claims, 2 Drawing Sheets

THERMALLY INSULATING JACKET AND RELATED PROCESS

This application is a continuation-in-part of U.S. Ser. No. 08/038,643 filed Mar. 29, 1993, now abandoned which in turn is a Continuation in that it discloses and claims subject matter in addition to that disclosed in prior, U.S. Ser. No. 07/979,326 entitled "IMPROVED PROCESS FOR EVACUATING A THERMALLY INSULATING JACKET AND IN PARTICULAR THE JACKET OF A DEWAR OR OF ANOTHER CRYOGENIC DEVICE" filed Nov. 20, 1992, abandoned.

BACKGROUND OF THE INVENTION

1) Field of the Invention

The present invention relates to an improved process for evacuating a thermally insulating jacket and in particular the jacket of a dewar or of another cryogenic device, like for instance dedicated pipings for the storage and/or the transport of cryogenic gases such as nitrogen, oxygen, hydrogen, helium, argon etc. or of other substances requiring the maintenance of a temperature different from room temperature, usually lower, the insulating features of said jackets being notoriously reached by means of vacuum and of an insulating material.

The new process is particularly advantageous, as it allows said jacket to be put in condition to work in a very short time.

2) The Prior Art

It is known, according to the common practice, to use for the purposes above dewars or pipings having a vacuum jacket in order to reach an adequate thermal insulation. As a further thermoinsulating measure, there is usually inserted in the jacket an insulating material like glass wool, expanded organic polymers (e.g. polyurethane and resins having various compositions) and, very frequently, the so called "multilayers". These latter are consisting of alternated sheets made from organic polymers (such as polyolefines), preferably showing a crosslinked structure, and of aluminized plastics, obtained for instance, as it is known, by coating a plastic film with aluminium by means of evaporation under vacuum.

It is also known that the vacuum, in said jacket, has the tendency to degrade along the time, because of the outgassing of the inner components and even of the walls (namely by emission of gaseous species like CO, $N_2$, $H_2$, $H_2O$, $O_2$ etc.) and owing to possible "leaks" (namely penetration of an atmospheric gas). In order to maintain the vacuum, there is normally utilized a gas sorbing material, placed in the jacket and generally consisting of zeolites, molecular sieves, silica gel, activated carbon (charcoal) and other sorbing material having physical action. These substances have to be kept at a very low temperature, e.g. the temperature of liquid nitrogen or a lower one, in order to allow the sorption of the most part of such gaseous species. Moreover, the physical sorbing materials hereinabove do not effectively sorb hydrogen. Therefore it was required in the past for instance, to insert in the jacket palladium oxide, as disclosed by GB-A-921273. Pd oxide in fact converts hydrogen into water, according to the reaction:

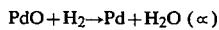

$PdO + H_2 \rightarrow Pd + H_2O$ ($\alpha$)

Water is then physically sorbed by the zeolites or by the other physical adsorbents present in the jacket.

A first drawback, coming from the use of these techniques, is due to the fact that the preparation of the insulating jacket of the dewars or of pipings above requires a very long time, because the activation of the physical adsorbents (zeolites and the like) requires an extended thermal treatment under pumping, which can even last several days.

The process length is mainly determined by the necessity of reducing as far as possible the residual amount of water contained in the physical adsorbents and in the insulating materials. A shorter time could be reached by drastically increasing the temperature of the thermal treatment of the system (e.g. beyond 150°–200° C.), but frequently this treatment can not be carried out because the involved materials are not consistent with such temperatures or because of practicality grounds or of grounds bound to the process economics.

A second drawback comes from the physical nature of the sorption, which makes the reaction reversible. Therefore, for instance, as a dewar is emptied and its inside is at room temperature, the sorbed gases are re-emitted thus giving rise to a certain pressure in the jacket. Consequently, during the filling of the inner vessel (of the dewar or of the piping), already returned to room temperature, there is observed a vigorous boiling, with a gas loss, because of the worsened insulation conditions. These are re-established after a certain time, once the zeolites have been cooled down to cryogenic temperature and have sorbed again the gases. Such a problem, known as "boil-off" or reboiling, is a serious one, especially in the case of liquefied gases like $H_2$ and He, which are relatively expensive and endowed with a low heat of evaporation. It should also be underlined the fact that a few of the known materials used so far do react with the liquefied gas, with which they can occasionally get into contact, as soon as there is a leakage from the inside of the vessel, e.g. because of the formation of cracks. PdO in particular cannot be utilized with liquefied $H_2$, because of possible explosions, in the case of breaking of the inner wall. The same occurs in the case of liquid $O_2$, when activated carbon (charcoal) is used.

It was suggested by C. Boffito et al., in J. Vac. Sci. Technol. A5 (6), 3442 (1987), to use a gettering material, based on a Zr-V-Fe alloy disclosed in GB-A-2043691. This material is actually solving a few of the problems hereinabove, as it can chemically sorb the different gases, responsible for the degrading of the vacuum, and especially hydrogen.

The insulating material however gives rise, during the manufacturing process, to a heavy release of water, which can considerably jeopardize the effectiveness of the sorption, with respect to the other gaseous species, all along the life of the device.

It is therefore a first object of the present invention to provide a process allowing to shorten the time required for evacuating and making ready the insulating jacket of a dewar or of an other cryogenic device, such as for containing and/or transporting liquefied gases.

Another object of the present invention is to provide a process of the kind hereinabove, free from said "boil-off" problems, during the filling of the vessel with liquefied gases, onche the vessel has got empty and after it has come back to room temperature.

A further object of the present invention is to provide a process allowing the elimination of the hazard bound to some of the materials used for the maintenance of vacuum, in particular palladium oxide and activated carbon (charcoal). These materials can react in fact in an explosive way with hydrogen and oxygen, respectively, if either of the two gases are present in a liquefied form, inside the vessel to be insulated and if such a vessel is undergoing a breakage.

Still another object of the present invention is to provide a process for obtaining an insulated device (dewar or piping) granting an effective chemical pumping, with respect to the undesired gases, all along the life of the same device.

DISCLOSURE

These objects can be accomplished by an improved process for evacuating and making ready a thermally insulating jacket and in particular the jacket of a dewar or of another cryogenic device, having an inner wall and an outer wall and having the inner space between said walls completely or partially filled with an insulating material, wherein said inner space also contains a moisture sorbing material and a getter material, characterized in that said moisture sorbing material is a chemical drying agent, preferably selected from the sorbing materials showing an $H_2O$ vapor pressure lower than 1 Pa and in particular from barium oxide, strontium oxide, phosphorus pentoxide and mixtures thereof.

When no liquid hydrogen is present inside or outside the jacket to be evacuated, said inner space may also advantageously contain a hydrogen converter like for instance the oxides of a few noble metals (palladium, iridium, osmium, rhodium, ruthenium); most preferred hydrogen converter is palladium oxide (PdO) optionally in admixture with said Ba oxide.

According to a preferred very effective embodiment, the new process comprises the following subsequent steps:

A. the inner space of the jacket is first evacuated down to a pressure lower than 100 Pa by means of a vacuum pump;

B. said inner space is contemporaneously exposed to said chemical drying agent, and optionally to said hydrogen converter (provided no liquid $H_2$ is present inside or outside the jacket) while keeping the getter in an inactivated form;

C. said inner space is further evacuated down to a pressure lower than 5 Pa, by means of a vacuum pump;

D. said getter is activated; and

E. the jacket is isolated from the pump, by sealing the connection between said pump and the inner space of the jacket.

Optionally the pumping under item A hereinabove can be discontinued during the operation under item B, and during the operation under item A and B the inner wall of said dewar, or of another cryogenic device, is kept hot, at a temperature not higher than 150° C. and preferably 120° C., thus promoting the release of water from the insulating material.

The operation under item B does normally last no more than 48 h and preferably from 2 to 48 h instead of the several days required in the past.

Moreover said chemical drying agent and said getter are preferably lying in separate zones, contrary to the previous teachings of the prior art, against the outer wall of said dewar or of other cryogenic device.

As to said getter, it may consist of the alloys which can be activated at a relatively low temperature, like those based on barium and/or zirconium and preferably the alloys Ba-Li as disclosed in the European Patent Application No. 92830186 in the name of the same applicant, in particular the alloy having raw formula Ba $Li_4$.

In other more detailed words the new improved process allows to evacuate and to make ready a thermal insulating jacket of a cryogenic device (dewar, transfer or storage pipings and so on) for the storage and/or the transport of a stuff which has to be kept at a temperature different from room temperature, in particular lower. Such a process allows to sorb the gases originated during the same process and during the subsequent life of the cryogenic device, by combining the action of a particular (chemical) water adsorbing agent, prevailingly acting in the first stages of the process (by providing a water pumping "in situ", which accelerates the same process) along with the action of a getter, activated only in a subsequent step, which is prevailingly acting as a chemical sorbing material with respect to the other gases different from water, like for instance $O_2$, $N_2$, CO, $H_2$, etc.

The invention is hereinafter described more clearly with reference to the following drawings, which are supplied for merely illustrating purposes, without limiting in any way the scope of the same invention, in which.

Figure 1:
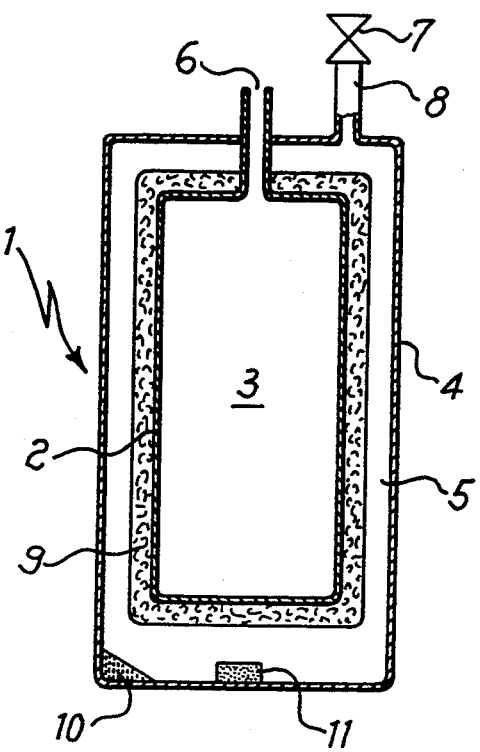
FIG. 1 shows a schematic sectional view of a commonly used metal dewar for the storage of liquefied gases, having an insulating jacket according to the invention.

The series of operations hereinbelow, embodying the process according to the invention, is described referring to a vessel like the dewar of FIG. 1.

As it is known, the dewar 1 consists of an inner container or vessel 2, preferably made from metal, e.g. steel, defining an inner volume or useful space 3, suitable to contain a liquefied gas, which can communicate with the surroundings by means of a "neck" 6, normally closed but not sealed. An outer wall or mantel 4 defines, along with the inner wall 2, a jacket 5, partially filled, at least in the portion surrounding the inner wall 2, with an insulating material 9, preferably the "multilayer" type herein above. The jacket 5 can communicate with an outer pumping system (not shown in the drawings) by means of a connecting fitting 8 and a valve 7 for switching off or disabling the pump.

According to the present invention, there are inserted in the jacket 5 a chemical moisture adsorber 10 and a gettering material (11) (and optionally, in certain cases pointed out hereinabove, a hydrogen converter) lying in separate zones, against the outer wall 4, contrary to the known prior art, describing the getter material to be positioned against the inner wall, at a lower temperature. Then a first pumping step of the jacket 5 starts, through the tubular fitting 8, until reaching a pressure of 100 Pa or lower, which is anyhow requiring only a few minutes. The valve 7 is subsequently closed, thus isolating the vessel wall from the pumping apparatus, and the water sorbing material 10 exerts, for a time between 2 and 48 h, a selective pumping action with respect to the water vapor outgassed from the insulating material 9.

During this step, the valve 7 can be also kept open all along said induction time. In such a case, however, the drying material 10 is always sorbing the most part of the water vapor, because the action of the pump is limited by the flow conductance allowed by connection pipe fitting 8. Again in this phase of water vapor sorption (with or without any pumping from outside) the inner wall 2 can undergo a smooth heating, not above 150° C., for istance by penetration into the space 3 of hot air or of hot water, in order to accelerate the removal of the water vapor from insulating material 9, in particular from the innermost layers, lying near the wall 2, more than the other layers.

After the induction time, pumping is started again, should it have been disabled, by re-opening the valve 7, down to a pressure of 5 Pa or less. At this point the getter 11 is activated, e.g. by means of a heat generating device arranged at the outside, at a location corresponding to the inside positioning of the same getter. The heating can simply occur by using a flame, a hot air gun, an electric resistance or other similar means. The temperature to be reached depends on the kind of getter selected for the use. Getters which can be activated at a low or very low temperature are preferred, like the Ba-Li alloys disclosed in the European Patent Application No. 92830186, inserted in a blister supplied with a thermoretractable cover, according to the European Patent Application No. 92830185 also in the name of the same Applicant. Getter materials of this kind do not require a heating at a temperature higher than 120° C. in order to be activated.

Eventually, during the last step of the process, the jacket 5 is definitely isolated from the outside by closure of the valve 7, isolation of the pump and sealing (e.g. by means of a "pinch-off") in correspondence to the tubular fitting 8.

The same getter is working in a much better way if the sorbed gas does not contain water. This is the reason why it is suggested to let the gases get into contact first with the powerful drying agent, such as BaO (and optionally with a hydrogen converter), and then, in a separate zone, with the getter, e.g. Ba Li$_4$.

Figure 3:
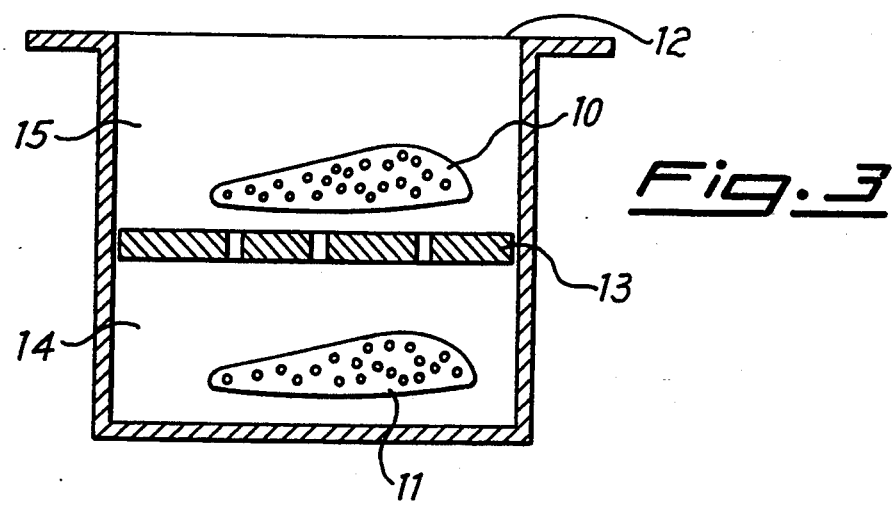
FIG. 3 shows a preferred arrangement of the drying agent and of the getter inside the vacuum jacket.

More in detail, and according to the embodiment of FIG. 3, said chemical drying agent 10 and said getter 11 can be arranged in a container 12 subdivided into an inner and an outer zone by a porous septum 13, wherein the inner zone 14 contains said getter; the outer zone 15 is communicating with the space containing said insulating material 9 and contains said chemical drying agent 10, which prevents the passage of the water vapour through said septum and towards said getter 11.

Container 12 may be vertical box having an opening at its top and a planar (e.g. horizontal) septum or a toroidal box, wrapping for instance the inner vessel of a dewar or of a cryogenic piping, having a radial or a planar (e.g. horizontal) septum.

The same container can be also a rigid, semirigid or flexible box, made from a substantially water-free material, preferably from metal, glass, ceramics or combinations thereof. It may have a toroidal shape, but also different shapes in cross section could be adopted, e.g. circular, square, rectangular, triangular, elliptical, oval, lobe-shaped and of similar configuration.

The following examples are supplied for illustrating purposes and do not limit in any way the scope of the invention.

EXAMPLE 1 (COMPARATIVE)

This example has the purpose to show the behaviour of a dewar like the one illustrated in FIG. 1, having a vacuum jacket prepared without utilizing the technique according to the present invention.

Said vacuum jacket, having a volume of 36 L and containing 500 g of a multilayer insulating material, consisting of polyolefinic tapes alternated with aluminized polyester tapes (traded as MYLAR tapes), was connected to an outer vacuum pump, of the rotary and turbomolecular type, while maintaining the pumping for 5 h. Subsequently the dewar was isolated and the pressure increase was started to be recorded along the time.

Figure 2:
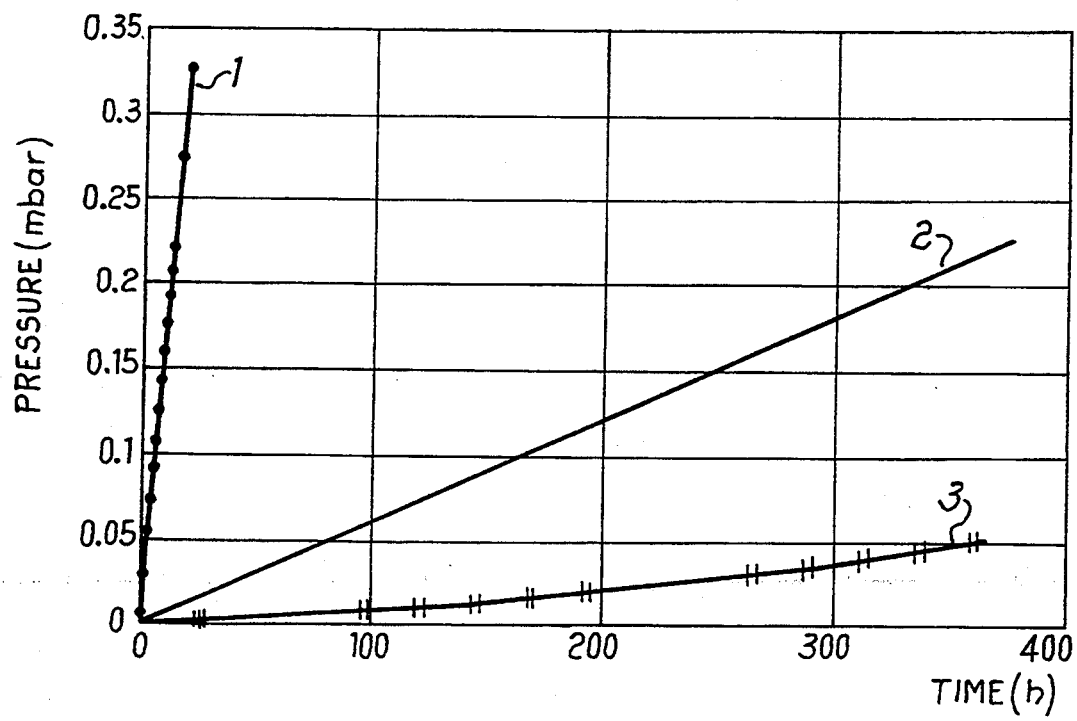
FIG. 2 shows a graph reporting the results of the tests carried out by means of said dewar of FIG. 1.

The results of these tests are represented by the line 1 of FIG. 2. Line 2, on the contrary, is showing the pressure increase merely due to the penetration of air into the jacket through the leaks present in the dewar, of the order of $6 \times 10^{-7}$ Pa m$^3$/s, on the basis of a measurement carried out by means of a mass spectrometer. The tested device was quite well representing the commonly used actual devices; however, in order to perform an accelerated test, there was produced the air leakage as indicated hereinabove, at least 5000 times greater than the value considered as allowable in the case of such an exploitment (normally of the order of $10^{-10}$ Pa m$^3$/s). It was thus possible to reproduce in a short time the effects of a long lasting leakage. The difference between line 1 and line 2 is due to the gases, prevailingly water, released by the outgassing of the inner insulating material.

EXAMPLE 2

The test of example 1 was repeated, while inserting however in the vacuum jacket, in the zones corresponding to the drying agent 10 and to the getter 11, respectively 10 g of BaO and 10 g of an alloy Ba Li$_4$, according to the European Patent Application 92830186, in the form of granules (small pellets) arranged in the thermoretractable containers (vessels) as disclosed in the European Patent Appliction 92830185.

The vacuum jacket was connected to the outer pump and submitted to a short pumping for 10 minutes. Then the system was isolated from the pump by closing the valve 7. Under such conditions, there was an induction time of 24 h, followed by a second stage (re-pumping of the system), by previously opening the valve 7, while contemporaneously activating the getter up to 120° C. by means of a heating device, arranged in an outside location, corresponding to the inside positioning of the same getter, while utilizing to this purpose a hot air gun. The activation time resulted to be 25 minutes; thereafter the system was isolated and recording of the pressure versus time was caused to start. The results of these tests are plotted as line 3 on FIG. 2.

EXAMPLE 3

Figure 4:
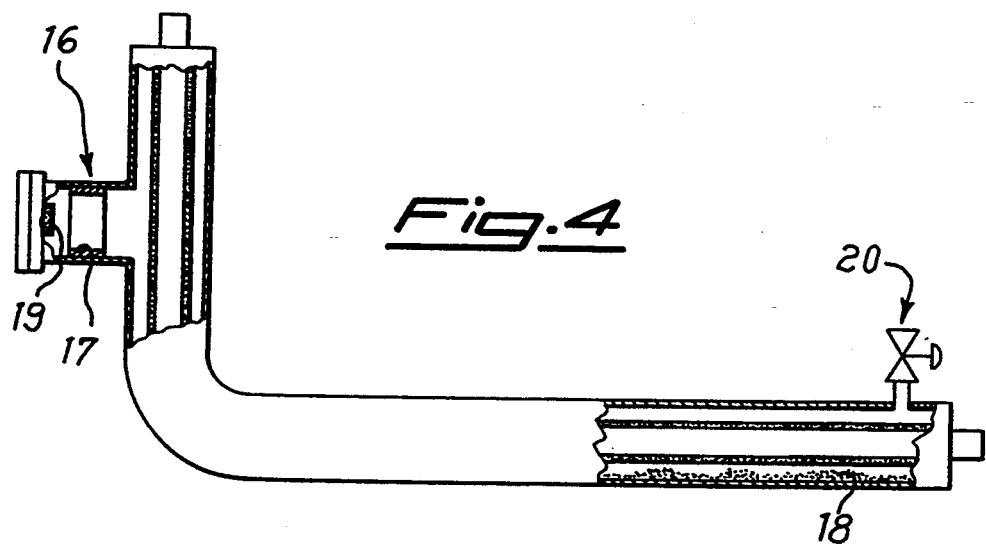
FIG. 4 shows a schematic sectional view of a commonly used metal pipe, for the transportation of liquified gases, having an insulation jacket evacuated according to the invention.

This example has the purpose to show the behaviour of the stainless steel pipe, to be used for transferring liquid nitrogen, illustrated in FIG. 4, insulated through a vacuum jacket, evacuated according to the technique of the present invention.

Said vacuum jacket had a volume of 20 liter and contained approximately 500 g of a multilayer insulation material, consisting of polyolefinic tapes alternated with aluminized polyester tapes (traded as MILAR), wrapped around the inner pipe.

The following materials were also contained in the jacket:

- 10 g of a $BaLi_4$ alloy according to the European Patent Application 92830186, in the form of granules (small pellets) arranged in a thermo-retractable container 17 as disclosed in the European Patent Application 92830185, placed in the getter compartment 16;
- 20 g of BaO (18), freely dispersed in the jacket; and
- 0,75 g of PdO granules, wrapped in a porous metallic packet 19, fixed onto the wall of the getter compartment 16.

The vacuum jacket was connected, by means of valve 20, to an outer pumping system, consisting of a diffusion and rotary pump, and checked for tightness, by means of a leak detector having a sensitivity of $5 \times 10^{-12}$ Pa $m^3/s$.

Pumping was then maintained for 15 h, blowing the inner pipe with hot air at 100°–120° C., to promote the degassing of the multilayer insulating material and, finally, the getter compartment 16 was heated at 120° C. by means of an external tape heater, thus causing the getter activation.

After 30 min. of activation, the jacket was isolated from the pumping system, by closing valve 19, and the pressure was recorded versus the time.

Figure 5:
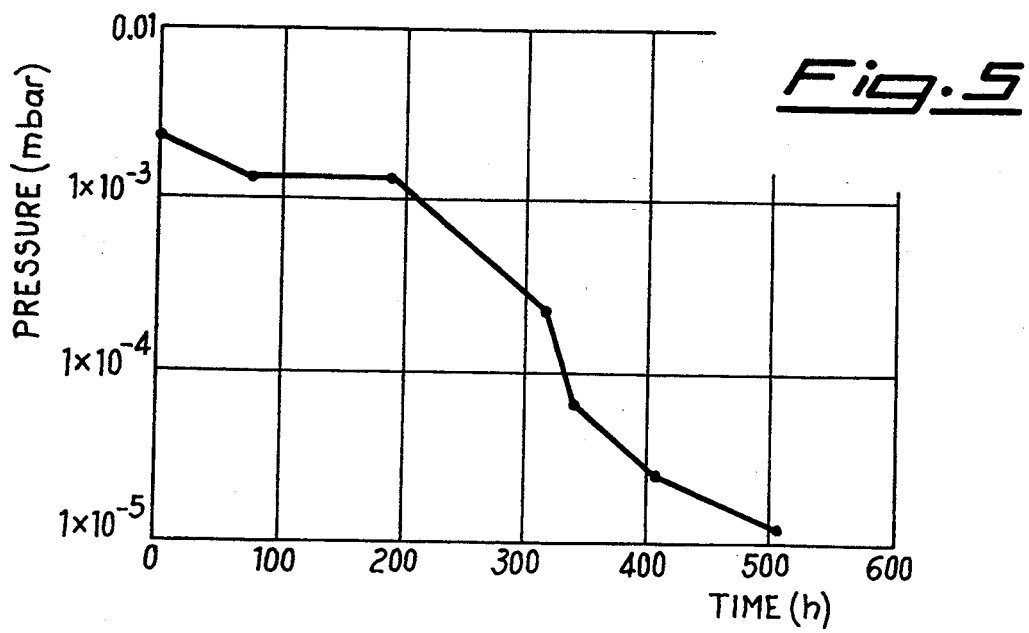
FIG. 5 shows a graph reporting the results of the tests carried out by means of the metal pipe of FIG. 4.

The results of this test are plotted in FIG. 5.

DISCUSSION

By comparing lines 1 and 3 of FIG. 2, it can be observed that applying the technique according to the invention allows for a substantial reduction of the pressure increase accurring in the cryogenic device after its sealing. A few analytical tests, carried out by means of a mass spectrometer, showed that the combined use of the two materials, drying agent and getter, does not only allow to quantitatively sorb the water outgassed by the insulating material, but also to face the leaks in the device. Further it should be appreciated that the tests were performed under accelerated conditions, namely under a more drastic condition, as to the load of atmosheric gases, with respect to those occurring in the practice. Therefore an accelerated test lasting 360 h (515 days) is equivalent to at least 20 years of actual working.

In the case of a cryogenic device, in which the leak rate is substantially lower and normally less than $10^{-10}$ $Pa \times m^3/s$, the pumping action exerted by the getter materials leads to an appreciable pressure drop after the sealing of the jacket, as shown by the line in FIG. 5.

It is understood that optional additions and/or changes can be carried out by those skilled in the art, with respect to the operative conditions hereinabove, without departing from the scope and spirit of the claimed invention.

What we claim is:

1. A process for producing an improved thermally insulating jacket, having an inner wall and an outer wall, and having an inner space between said walls containing an insulating material, wherein said inner space also contains a moisture sorbing material and a getter material, wherein said moisture sorbing material is a moisture sorbing material, having a $H_2O$ vapor pressure lower than 1 Pa at room temperature, characterized by the following steps:

A. evacuating the inner space of the jacket down to a pressure lower than 100 Pa by means of a vacuum pump having a connection between the pump and the inner space of the jacket;
   B. exposing said inner space contemporaneously to said moisture sorbing material while keeping the getter in an inactivated form;
   C. evacuating said inner space farther, down to a pressure lower than 5 Pa, by means of the vacuum pump;
   D. activating said getter; and
   E. isolating the jacket from the vacuum pump, by sealing the connection between said vacuum pump and the inner space of the jacket.

2. A process according to claim 1 characterized in that during the exposing of step B, the evacuating according to Step A is discontinued.

3. A process according to claim 2 wherein step B lasts from about 2 to about 48 hours.

4. A process according to claim 1, characterized in that during the Steps A and B, the inner wall is kept hot at a temperature of not higher than 150° C. thus promoting the release of water from the insulation material.

5. A process according to claim 4 wherein step B lasts from about 2 to about 48 hours.

6. A process according to claim 1, characterized in that the step B lasts for up to 48 hours.

7. A process according to claim 1 characterized in that said moisture absorbing material and said getter are lying, in separate locations, against the outer wall of said jacket.

8. A process according to claim 7 characterized in that said moisture sorbing material and said getter are arranged in a container subdivided into an inner zone and an outer zone by a porous septum, wherein:

the inner zone contains said getter;
   the outer zone is communicating with the inner zone containing said insulating material and contains said moisture sorbing material which prevents the passage of water vapour through said septum and towards said getter.

9. A process according to claim 8 characterized in that said container is a vertical box having an opening at its uppermost portion and a planar septum.

10. A process according to claim 8 characterized in that said container is a toroidal box having a radial or planar septum.

11. A process according to claim 9, characterized in that said septum is horizontal.

12. A process according to claim 8, characterized in that said container is a rigid, semirigid or flexible box.

13. A process according to claim 8, characterized in that said container is made from a substantially water-free material, selected from the group consisting of metal, glass, ceramics and combinations thereof.

14. A process according to claim 1, characterized in that said getter material is an alloy having the formula $BaLi_4$.

15. A process according to claim 1 wherein step B lasts from about 2 to about 48 hours.

16. A process according to claim 1, characterized in that said septum is horizontal.

17. A jacket of claim 1 wherein said moisture sorbing material is selected from the group consisting of barium oxide, strontium oxide, phosphorous oxide, and mixtures thereof.

18. An improved thermally insulating jacket, having an inner wall and an outer wall, and having an inner space between said walls completely or partially filled with an insulating material, wherein said inner space also contains:
- A. a moisture sorbing material selected from the group consisting of barium oxide, strontium oxide, phosphorous oxide, and mixtures thereof; and
- B. a getter material which is an alloy of the formula $BaLi_4$.

19. An improved thermally insulating jacket, having an inner wall and an outer wall, and having an inner space between said walls completely or partially filled with an insulating material, wherein said inner space also contains:
- A. a moisture sorbing material selected from the group consisting of barium oxide, strontium oxide, phosphorous oxide, and mixtures thereof; and
- B. a getter material which is an alloy of the formula $BaLi_4$; and
- C. a hydrogen converter selected from the group consisting of osmium oxide, iridium oxide, ruthenium oxide, rhodium oxide and palladium oxide.

20. An improved thermally insulating jacket, having an inner wall and an outer wall, and having an inner space between said walls completely or partially filled with an insulating material, wherein said inner space also contains:
- A. a moisture sorbing material which is barium oxide; and
- B. a getter material which is an alloy of the formula $BaLi_4$; and
- C. a hydrogen converter which is palladium oxide.

* * * * *